April 2, 1929.  J. FRASER  1,707,352
STOPPER
Filed Sept. 22, 1926
Fig. 1,
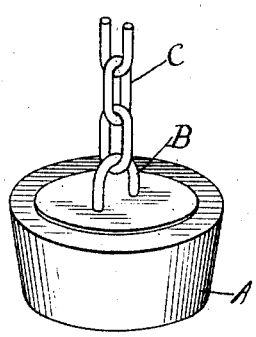
Fig. 2,
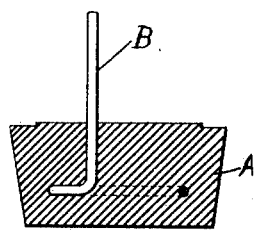
Fig. 3,
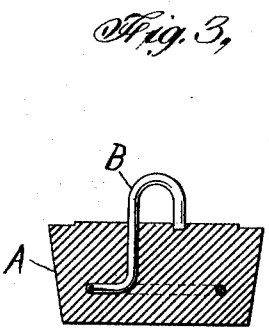
Fig. 4,
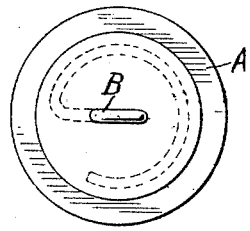
Fig. 5,
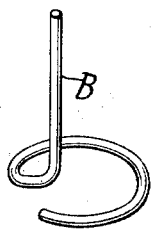
INVENTOR
JAMES FRASER
BY
John E. Hubbell
ATTORNEY Patented Apr. 2, 1929.

1,707,352

UNITED STATES PATENT OFFICE.

JAMES FRASER, OF EDGEMOOR, DELAWARE, ASSIGNOR TO SPEAKMAN COMPANY, OF WILMINGTON, DELAWARE, A CORPORATION OF DELAWARE.

STOPPER.

Application filed September 22, 1926. Serial No. 137,061.

The general object of my present invention is to provide an improved construction of a stopper of the general type commonly used to removably close lavatory receptacle drain outlets. More specifically, the object of my invention is to provide an improved form of stopper insert for detachably connecting the stopper to the chain or analogous device ordinarily connected to the waste or drain outlet opening stopper of a lavatory receptacle or the like.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of my invention.

Of the drawings:

Fig. 1 is a perspective view of a stopper and attached chain;

Fig. 2 is a vertical section of a partially manufactured stopper;

Fig. 3 is a vertical section of the stopper shown in Fig. 1;

Fig. 4 is a plan view of the stopper; and

Fig. 5 is a perspective view of the insert in an intermediate stage or form.

The stopper shown in the drawing comprises a plug or body A of moulded rubber shaped in the usual form. Imbedded in the body A is the enlarged base portion of an insert B having an externally projecting end portion in the form of a loop or staple, the free end of which is in contact with the upper surface of the rubber body A or, preferably, is forced slightly below the surface thereof.

In the preferred form of the invention as shown by the drawings, the insert is in the form of a metallic wire having one end bent into circular form and imbedded in the rubber body and having its other end extending radially inward towards the center of the base circle and then turned in a vertical direction to form a vertical projecting end. The projecting end is bent into the form of a staple or loop-like portion to which a chain C may be attached.

In the ordinary manufacture of my invention the insert B with its free end portion unbent as shown in Fig. 5, is placed in the mold in which the rubber body A is to be formed with the circular part of the insert in a horizontal plane in the lower half of the mold and held in that position by any suitable means. After the stopper body has been formed and has been removed from the mold, the parts then being in the form as shown in Fig. 2, the vertical upper portion of the insert B is bent into a loop, preferably with the vertical legs spaced approximately equidistant from the center of the circular top of the stopper as shown in Fig. 3. A chain C may then be attached to the stopper by prying up the free end of the external insert loop portion sufficiently to permit the chain link to be inserted under the open end of the loop, which is then restored to its position in contact with or below the top surface of the stopper.

The wire used in the construction described is ordinarily sufficiently stiff so that the loop portion is not liable to become bent due to the stresses caused by the chain when the stopper is being removed from the drain outlet. The rigidity of the insert and the arrangement of the free end of the loop below the top surface of the body A prevents the chain link from becoming disengaged with the loop while in use, but the free end of the loop may be pried up to disconnect the chain whenever this becomes necessary as to effect stopper body renewals. This feature of the invention is especially important as rubber stopper bodies frequently become worn after constant use and must be replaced.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I desire to secure by Letters Patent, is:—

1. A plug stopper adapted to be removably seated in a lavatory port, comprising a plug body, and a separate part including a base portion imbedded in said body and a portion projecting from the top surface of said body and so bent that its free end is normally in engagement with said body, said body and port having such limited relative elasticity that said free end is not withdrawn from contact with said body by the force normally required to unseat said stopper, but by the application of a greater force, said free end may be separated from said body to permit said free end to be inserted into or removed from an apertured attachment to said stopper.

2. A plug stopper adapted to be removably seated in a lavatory port comprising an elastic plug body and a metallic part having an enlarged base portion imbedded in said body, and a projecting end portion in the form of an open loop the free end of which is normally reentered in said body but which may be separated from said body by compressing the latter, to thereby permit said free end to be inserted in or removed from an apertured attachment to said stopper.

Signed at Wilmington, in the county of Newcastle, and State of Delaware, this 17th day of September, A. D. 1926.

JAMES FRASER.